United States Patent

Nishio et al.

[11] Patent Number: 5,567,877
[45] Date of Patent: Oct. 22, 1996

[54] MULTIPLE-AXIS GAS FLOW TYPE ANGULAR VELOCITY SENSOR

[75] Inventors: Tomoyuki Nishio; Nariaki Kuriyama; Nobuhiro Fueki, all of Wako, Japan

[73] Assignee: Honda Giken Kogyo Kabushiki Kaisha, Tokyo, Japan

[21] Appl. No.: 408,996

[22] Filed: Mar. 23, 1995

[30] Foreign Application Priority Data

Mar. 24, 1994 [JP] Japan .................... 6-054120

[51] Int. Cl.$^6$ ........................................ G01P 9/00
[52] U.S. Cl. ................ 73/504.06; 73/514.03; 73/204.25
[58] Field of Search ............. 73/504.06, 504.05, 73/504.17, 204.22, 204.25, 204.26, 514.03, 514.39; 29/595

[56] References Cited

U.S. PATENT DOCUMENTS

| | | | |
|---|---|---|---|
| 3,631,729 | 1/1972 | Moore | 73/516 |
| 3,635,095 | 1/1972 | Schuemann | 73/505 |
| 4,020,699 | 5/1977 | Schaffer | 73/504.06 |
| 4,026,159 | 5/1977 | Isakson et al. | 73/504.06 |
| 4,147,063 | 4/1979 | Bower et al. | 73/504 |
| 4,156,364 | 5/1979 | Hill | 73/504.06 |
| 4,254,659 | 3/1981 | Benedetto et al. | 73/504.05 |
| 4,348,900 | 9/1982 | Takahashi et al. | 73/505 |
| 4,407,161 | 10/1983 | Ferrar | 73/504.06 |
| 4,408,490 | 10/1983 | Takahashi et al. | 73/497 |
| 4,542,650 | 9/1985 | Renken et al. | 73/204 |
| 4,584,878 | 4/1986 | Katsuno | 73/497 |
| 4,592,232 | 6/1986 | Moffatt et al. | 73/504.06 |
| 4,717,891 | 1/1988 | Ichise et al. | 331/17 |
| 4,930,349 | 6/1990 | Takahashi et al. | 73/497 |
| 4,951,507 | 8/1990 | Takahashi et al. | 73/497 |
| 5,012,676 | 5/1991 | Takahashi et al. | 73/497 |
| 5,107,707 | 4/1992 | Takahashi et al. | 73/516 |
| 5,270,960 | 12/1993 | Ikegami et al. | 364/571.03 |
| 5,385,046 | 1/1995 | Yamakawa et al. | 73/516 LM |
| 5,438,871 | 8/1995 | Hosoi et al. | 73/504.05 |
| 5,476,820 | 12/1995 | Fueki et al. | 437/250 |

FOREIGN PATENT DOCUMENTS

| | | |
|---|---|---|
| 8802819 | 4/1988 | European Pat. Off. . |
| 59-218913 | 12/1984 | Japan . |
| 61-180147 | 8/1986 | Japan . |
| 63-81269 | 4/1988 | Japan . |
| 63-118667 | 5/1988 | Japan . |
| 63-293472 | 11/1988 | Japan . |
| 63-293471 | 11/1988 | Japan . |
| 63-298066 | 12/1988 | Japan . |
| 63-298067 | 12/1988 | Japan . |
| 63-298068 | 12/1988 | Japan . |

*Primary Examiner*—Hezron E. Williams
*Assistant Examiner*—Helen C. Kwok
*Attorney, Agent, or Firm*—Lyon & Lyon

[57] ABSTRACT

A multiple-axis gas flow type angular velocity sensor which can accurately and stably detect the magnitude and direction of angular velocities acting in any direction on the sensor main body is provided by performing precision processing on semiconductor substrates using a photo engraving process, which is a process for producing semiconductors, and forming a plurality of pairs of thermosensitive resistor elements, a gas passage and a sensor case by laminating a plurality of semiconductor substrates.

14 Claims, 6 Drawing Sheets

5,567,877

MULTIPLE-AXIS GAS FLOW TYPE ANGULAR VELOCITY SENSOR

BACKGROUND OF THE INVENTION

1. Field of the Invention

The present invention relates to a multiple-axis gas flow type angular velocity sensor which detects angular velocity in a plurality of directions such as a yaw direction and a pitch direction, and in particular relates to a multiple-axis gas flow type angular velocity sensor which is constructed using a semiconductor production process.

2. Description of the Related Art

Known conventional multiple-axis gas flow type angular velocity sensors include those in which thermosensitive resistor elements are constructed from thin platinum or tungsten wires, a plurality of thermosensitive resistor elements are attached in pairs to supports provided in a case and are located such that angular velocity in the desired directions is detected information on such instruction may be referred to in Japanese Publication S61-180147.

Conventional multiple-axis gas rate sensors have a construction in which discrete component thermosensitive resistor elements, consisting of thin platinum or tungsten wires, are attached to supports, and there are therefore problems relating to positional accuracy involving the location of the paired thermosensitive resistor elements, for example the distance to the central axis of the gas flow and the direction (perpendicular) with respect to the central axis, and there are also problems due to the time required for adjustment operations in order to maintain positional accuracy.

Further, in conventional multiple-axis gas flow type angular velocity sensors, the thermosensitive resistor elements, the supports and the case are constructed from discrete components, and there are problems in that it is necessary to select components to unify the pairing properties and characteristics of individual thermosensitive resistor elements (resistance and temperature characteristics).

SUMMARY OF THE INVENTION

In the present invention, a pair of thermosensitive resistor elements, or one or more thermosensitive resistor elements, and a space which forms a gas passage are formed on a semiconductor substrate using a photo engraving process, which is a semiconductor production process.

By laminating a plurality of these semiconductor substrates, a sensor case which has a sealed space which forms a gas passage is formed, and a multiple-axis gas flow type angular velocity sensor is provided, in which a plurality of pairs of thermosensitive resistor elements are mutually perpendicular, by the thermosensitive resistor elements being located mutually perpendicular to and symmetrical about the central axis of the gas flow.

In the multiple-axis gas flow type angular velocity sensor according to the present invention, constructed as described above, thermosensitive resistor elements are formed on semiconductor substrates such as silicon using a photo engraving process, which is a process for producing semiconductors, and thermosensitive resistor elements with good pairing properties are located accurately in desired positions, and it is therefore possible to detect angular velocity acting in any direction accurately and stably.

Further, in the multiple-axis gas flow type angular velocity sensor according to the present invention it is possible to construct a sensor including a gas passage and a case by laminating a plurality of semiconductor substrates formed by micro-scale processes, and miniaturization and cost-effectiveness of the sensor can therefore be planned.

DETAILED DESCRIPTION

A preferred embodiment of the present invention will now be described with reference to the attached drawings.

Figure 1:
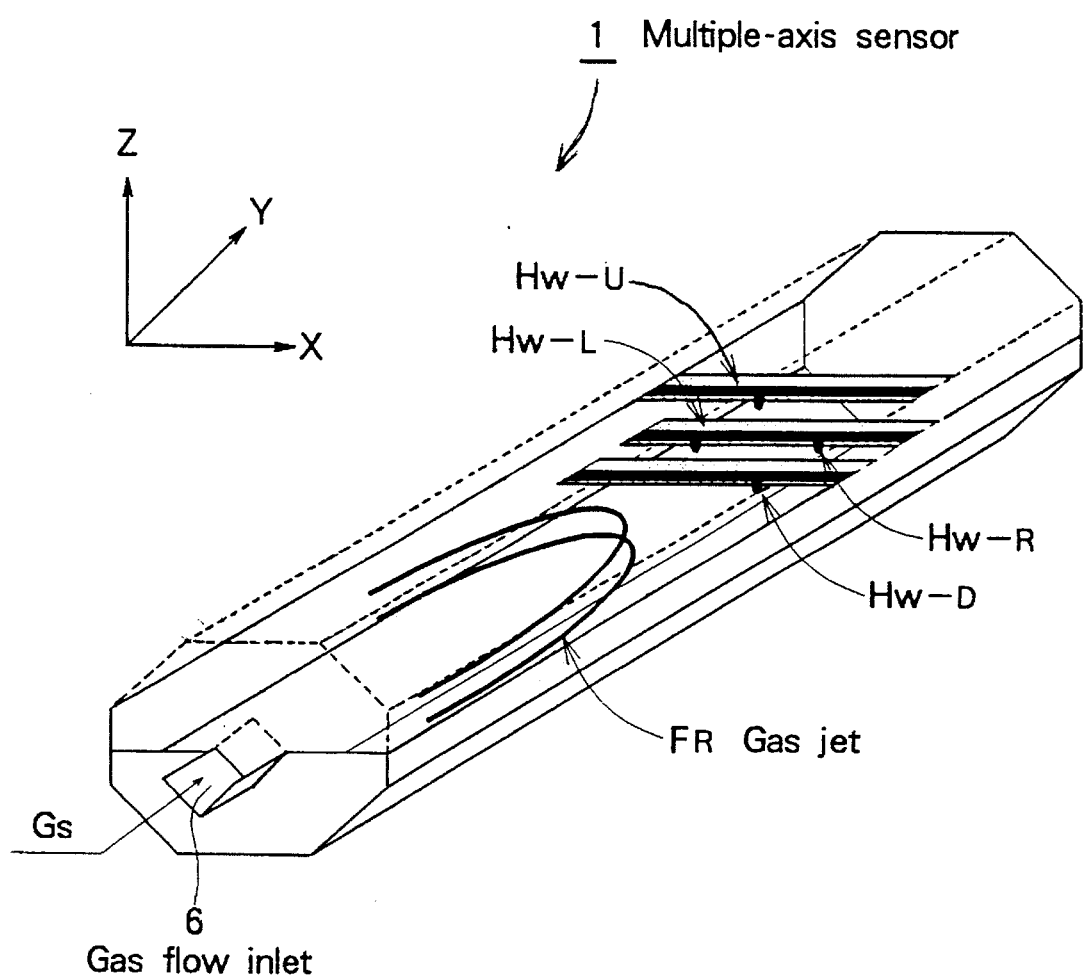
FIG. 1 is a perspective view of a structure of a multiple-axis gas flow type angular velocity sensor according to the present invention.
Figure 2:
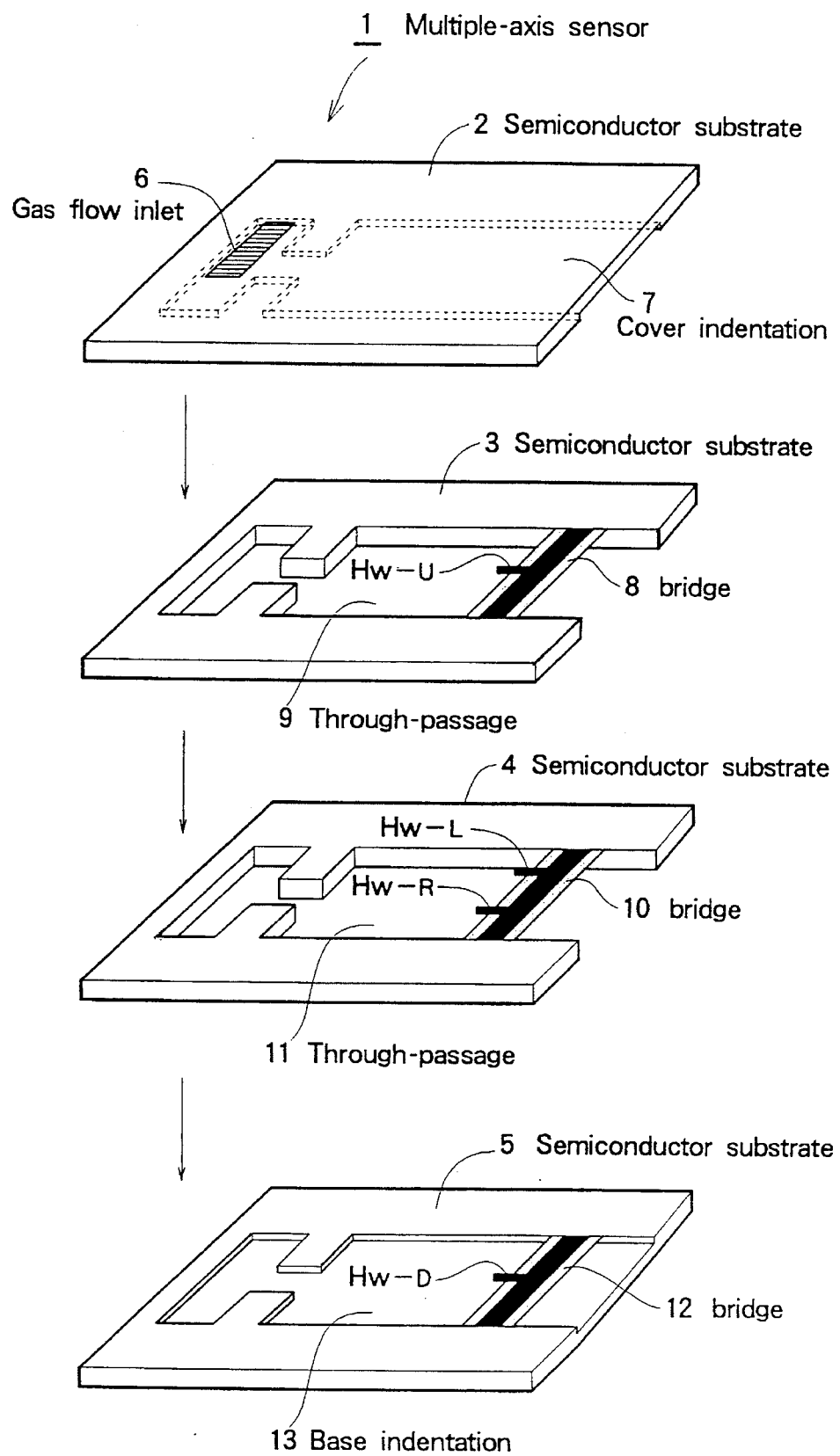
FIG. 2 is a exploded perspective view of the structure of a multiple-axis gas flow type angular velocity sensor according to the present invention.

FIG. 1 is an external perspective of a multiple-axis gas flow type angular velocity sensor according to the present invention, and FIG. 2 is an exploded perspective view of this multiple-axis gas flow type angular velocity sensor according to the present invention.

In FIG. 1, the multiple-axis gas flow type angular velocity sensor 1 indicates an embodiment of a double-axis gas flow type angular velocity sensor, in which thermosensitive resistor elements $H_{W-L}$, $H_{W-R}$, $H_{W-U}$, and $H_{W-D}$, a gas flow inlet 6 through which gas $G_S$ is input, a gas passage through which a gas jet $F_R$ flows, and upper and lower cases, for example, are formed as semiconductor components, using a semiconductor production process such as a photo engraving process, on a plurality of semiconductor substrates such as silicon, after which the sensor is constructed by laminating the plurality of semiconductor components using batch processing.

One pair of thermosensitive resistor elements $H_{W-L}$ and $H_{W-R}$ are located facing each other in a left-right direction (X axis) perpendicular to the central axis of the gas flow (Y axis), and detect the angular velocity acting on the multiple-axis gas flow type angular velocity sensor 1 with the Z axis as the axis of rotation.

Further, a pair of thermosensitive resistor elements $H_{W-U}$ and $H_{W-D}$ are located facing each other an up-down direction (Z axis) which is perpendicular to both the central axis of the gas flow (Y axis) and the perpendicular direction (X axis), and detect the angular velocity acting on the multiple-axis gas flow type angular velocity sensor 1 with the X axis as the axis of rotation.

Considering a situation in which the multiple-axis gas flow type angular velocity sensor 1 is mounted on a moving body (for example a vehicle), running in the Y-axis direction, the thermosensitive resistor elements $H_{W-L}$ and $H_{W-R}$ detect angular velocity in the horizontal (yaw) direction, while the thermosensitive resistor elements $H_{W-U}$ and $H_{W-D}$ detect angular velocity in the direction in which the front and rear of the moving body (for example a vehicle) rise and fall (pitch).

The gas jet $F_Y$ flows in the form of a parabolic body of rotation with the Y axis of the gas passage of the multiple-axis gas flow type angular velocity sensor 1 as the axis of symmetry, and therefore the gas flow acts simultaneously on the thermosensitive resistor elements $H_{W-L}$ and $H_{W-R}$, and the thermosensitive resistor elements $H_{W-U}$ and $H_{W-D}$, and therefore angular velocity in the yaw direction and the pitch direction are detected simultaneously.

For example, if an angular velocity acts in the yaw direction, then the Coriolis force acts and the gas flow is deflected, the balance of the amount of gas coming into contact with the thermosensitive resistor elements $H_{W-L}$ and $H_{W-R}$ is disturbed, the resistances of the thermosensitive resistor elements $H_{W-L}$ and $H_{W-R}$ change, and it is possible to detect the magnitude and direction of the angular velocity in the yaw direction.

However, if an angular velocity acts only in the yaw direction, the amount of gas coming into contact with the thermosensitive resistor elements $H_{W-U}$ and $H_{W-D}$ are maintained, and no angular velocity in the pitch direction is detected.

Further, if an angular velocity acts only in the pitch direction, the Coriolis force acts on the gas flow in the pitch direction, causing the gas flow to be deflected, the balance of the amount of gas coming into contact with the thermosensitive resistor elements $H_{W-U}$ and $H_{W-D}$ is disturbed, the resistances of the thermosensitive resistor elements $H_{W-U}$ and $H_{W-D}$ change, and it is possible to detect the magnitude and direction of angular velocity in the pitch direction, but no angular velocity in the yaw direction is detected.

In this way it is possible to construct a double-axis angular velocity rate sensor in which the detection of the yaw direction and pitch direction are independent from each other.

It should be noted that if an angular velocity acts simultaneously in the yaw direction and the pitch direction, the gas flows in the yaw direction and the pitch direction are deflected simultaneously, and it is therefore possible to detect the magnitude and direction of the angular velocity in the yaw direction and the pitch direction simultaneously.

The construction of a multiple-axis (double-axis) gas flow type angular velocity sensor will now be described.

FIG. 2 is an exploded perspective view of a multiple-axis gas flow type angular velocity sensor according to the present invention.

In FIG. 2, the multiple-axis gas flow type angular velocity sensor i consists of semiconductor substrate 2 through semiconductor substrate 5.

The semiconductor substrate 2 is formed, using a semiconductor production process such as a photo engraving process, with a gas flow inlet in the up/down direction of the substrate and a cover indentation 7 which has a space which is a specified width from the lower surface of the substrate, and it constitutes an upper cover of the multiple-axis gas flow type angular velocity sensor 1.

A bridge 8 is formed in the semiconductor substrate 3 using a semiconductor production process in which vacuum evaporation and a plurality of etching processes are repeated, and the semiconductor substrate 3 is provided with a thermosensitive resistor element $H_{W-U}$, which is formed by etching and patterning after platinum or tungsten has been vacuum evaporated onto a prescribed position on the bridge 8, and with leads and external connection pads which are formed by patterning a semiconductor material.

It should be noted that the thermosensitive resistor element $H_{W-U}$ and a thermosensitive resistor element $H_{W-D}$ which is formed on the semiconductor substrate 5 constitute a pair of sensors, and these are positioned accurately in advance using a production mask such that they detect angular velocity in the pitch direction.

Further, a space underneath the bridge, and a through-passage 9, constituting part of the gas passage, are formed in the semiconductor substrate 3 by etching.

The semiconductor substrate 4 is formed with a space underneath the bridge, and with a through-passage 11 using the same processes as for the semiconductor substrate 3, except that a pair of thermosensitive elements $H_{W-L}$ and $H_{W-R}$ are formed in prescribed positions on the bridge 10.

It should be noted that the pair of thermosensitive resistor elements $H_{W-L}$ and $H_{W-R}$ are positioned accurately in advance using a production mask such that they detect angular velocity in the yaw direction, in the same way as with the thermosensitive resistor element $H_{W-U}$ formed on the semiconducor substrate 3.

The semiconductor substrate 5 is formed with a bridge 12 and the thermosensitive resistor element $H_{W-D}$, in exactly the same way as the semiconductor substrate 3.

Further, a space enclosed by a gas passage floor 13 is formed by etching, thereby constructing the lower cover of the multiple-axis (double-axis) gas flow type angular velocity sensor 1.

After the semiconductor substrate 2 through semiconductor substrate 5 have been formed by means of a semiconductor production process, the semiconductor substrate 2 through semiconductor substrate 5 are laminated in one direction to form the multiple-axis (double-axis) gas flow type angular velocity sensor 1.

In this way it is possible to construct the multiple-axis (double-axis) gas flow type angular velocity sensor I with good positional accuracy by accurately setting the positions of the thermosensitive resistor elements $H_{W-L}$, $H_{W-R}$, $H_{W-U}$ and $H_{W-D}$ using production masks, and forming them using a semiconductor production process such as vacuum evaporation and etching.

Further, it is possible to form the pair of thermosensitive resistor elements $H_{W-L}$ and $H_{W-R}$, and the pair of thermosensitive resistor elements $H_{W-U}$ and $H_{W-D}$ with highly accurate respective resistance ratios.

Figure 3:
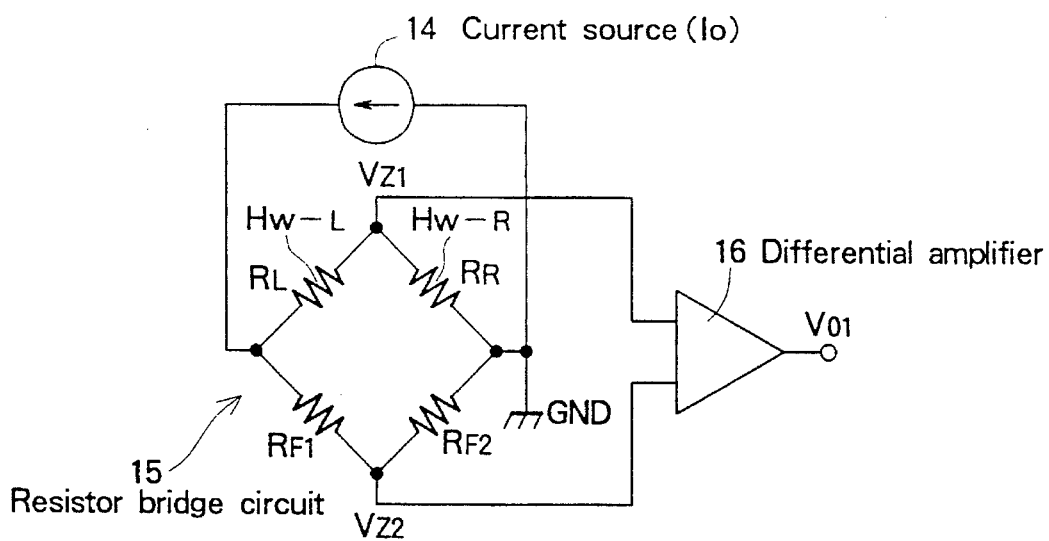
FIG. 3 is a circuit diagram showing components for detecting angular velocity in the yaw direction corresponding to FIG. 1.
Figure 4:
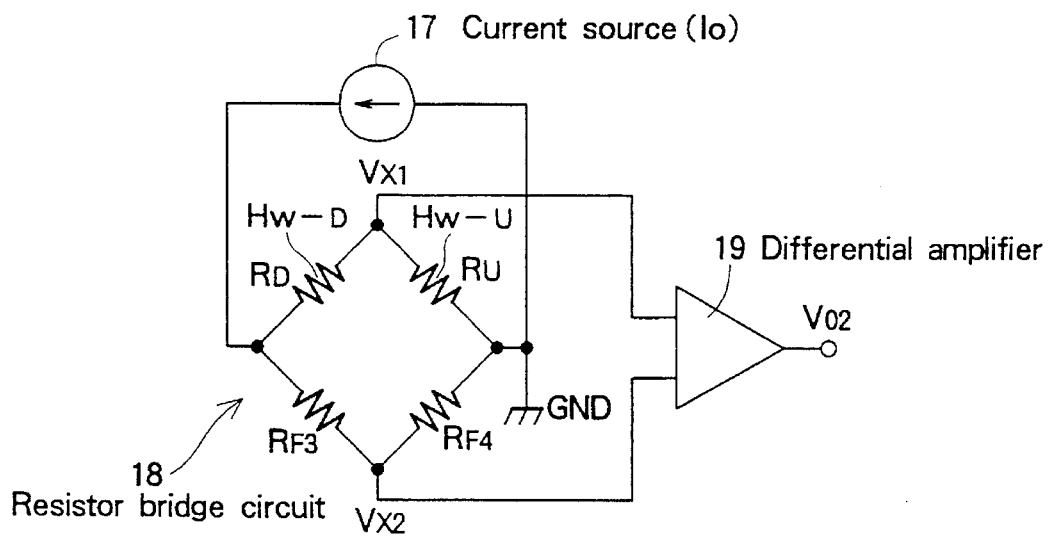
FIG. 4 is a circuit diagram showing components for detecting angular velocity in the pitch direction corresponding to FIG. 1.

FIG. 3 shows a circuit diagram for detecting angular velocity in the yaw direction and FIG. 4 shows a circuit diagram for detecting angular velocity in the pitch direction, corresponding to FIG. 1.

The circuit in FIG. 3 has a construction in which thermosensitive resistor elements $H_{W-L}$ (resistor $R_L$) and $H_{W-R}$ (resistor $R_R$), and reference resistors $R_{F1}$ and $R_{F2}$ constitute a resistor bridge circuit 15, and after obtaining direct current voltage outputs $V_{Z1}$ and $V_{Z2}$ by driving the resistor bridge circuit using a supply (constant current supply $I_o$), a detected angular velocity output $V_{01}$, corresponding to the difference $(V_{Z1}-V_{Z2})$ is obtained by feeding the outputs $V_{Z1}$ and $V_{Z2}$ to a comparator such as a differential amplifier 16.

If the reference resistors $R_{F1}$ and $R_{F2}$ are set to the same value, then the detected angular velocity output $V_{01}$ which is obtained is proportional to the resistance difference ($R_R-R_L$), and it is possible to detect angular velocity acting in the yaw direction.

It should be noted that the magnitude of the angular velocity is obtained from the level of the detected output $V_{01}$, and the direction of the angular velocity is obtained from the sign of the detected output $V_{01}$.

In the same way, in FIG. 4, a resistor bridge circuit 18 is constituted by thermosensitive resistor elements $H_{W-U}$ (resistor $R_U$) and $H_{W-D}$ (resistor $R_D$), and reference resistors $R_{F3}$ and $R_{F4}$ ($R_{F3}=R_{F4}$) and therefore a detected angular velocity output $V_{02}$ corresponding to the difference between the direct current voltage outputs ($V_{X1}-V_{X2}$) (corresponding to the resistance difference $R_U-R_D$) is obtained from a differential amplifier 19, and it is possible to detect angular velocity acting in the pitch direction.

Figure 5:
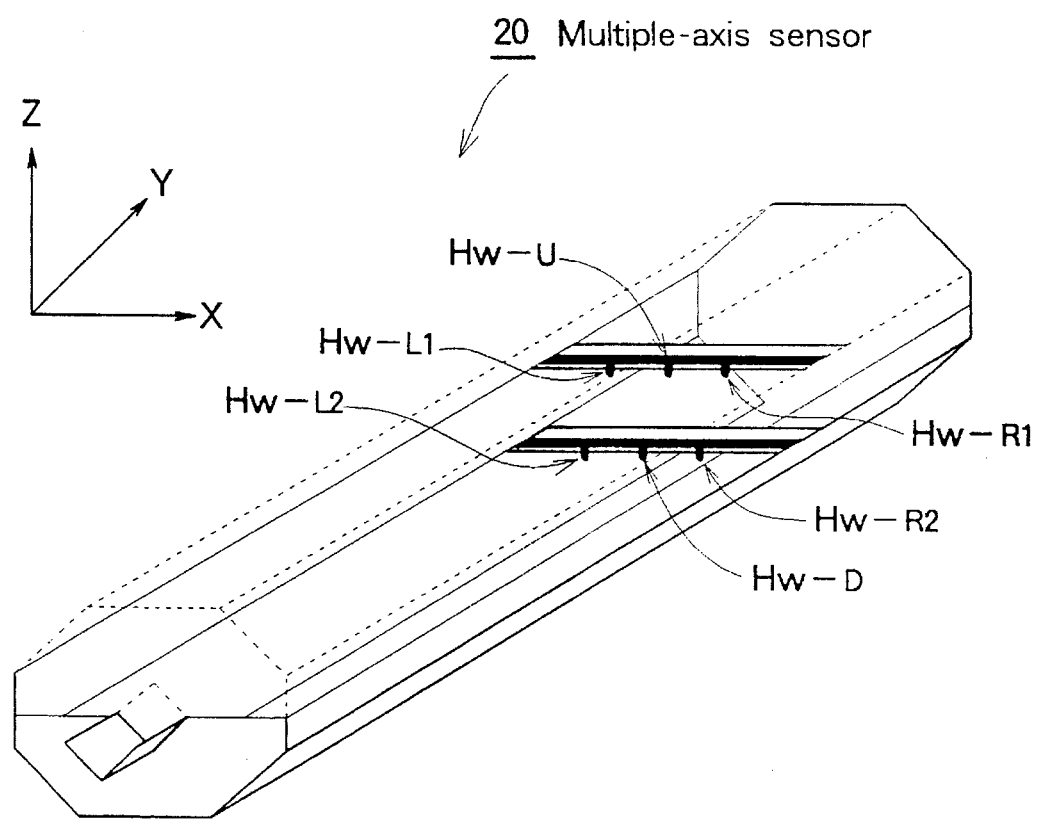
FIG. 5 is a perspective view of a structure of an alternative embodiment of a multiple-axis (double-axis) gas flow type angular velocity sensor according to the present invention.

FIG. 5 is a perspective view of an alternative embodiment of a multiple-axis (double-axis) gas flow type angular velocity sensor according to the present invention.

In FIG. 5, the construction is different from FIG. 1 in that the multiple-axis (double-axis) gas flow type angular velocity sensor 20 is provided with two bridges with three thermosensitive resistor elements on each of the bridges.

Thermosensitive resistor elements $H_{W-R1}$, $H_{W-U}$ and $H_{W-L1}$ are formed on one of the bridges, and thermosensitive resistor elements $H_{W-R2}$, $H_{W-D}$ and $H_{W-L2}$ are formed on the other bridge, thereby forming the sensor, and it is possible to eliminate one of the semiconductor substrates shown in FIG. 2 (for example either the semiconductor substrate 3 or 4).

The angular velocity in the yaw direction is detected from a combination of the thermosensitive resistor elements $H_{W-R1}$ and $H_{W-R2}$ (corresponding to $H_{W-R}$ in FIG. 2), and $H_{W-L1}$ and $H_{W-L2}$ (corresponding to $H_{W-L}$ in FIG. 2), and angular velocity in the pitch direction is detected from a combination of the thermosensitive resistor elements $H_{W-U}$ and $H_{W-D}$ (as in FIG. 2).

Figure 6:
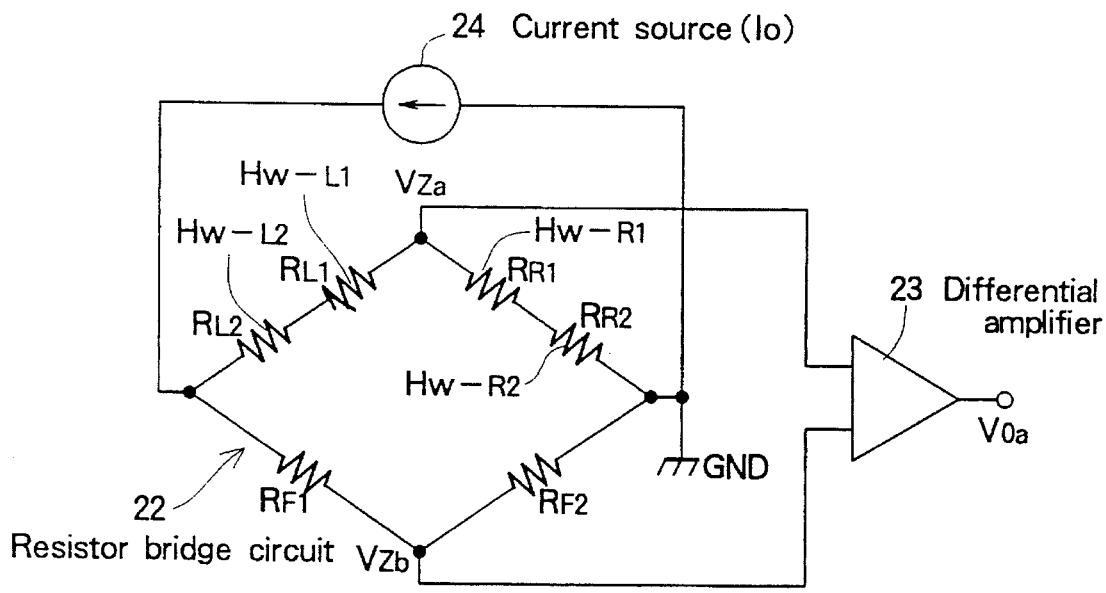
FIG. 6 is a circuit diagram showing components for detecting angular velocity in the yaw direction corresponding to FIG. 5.
Figure 7:
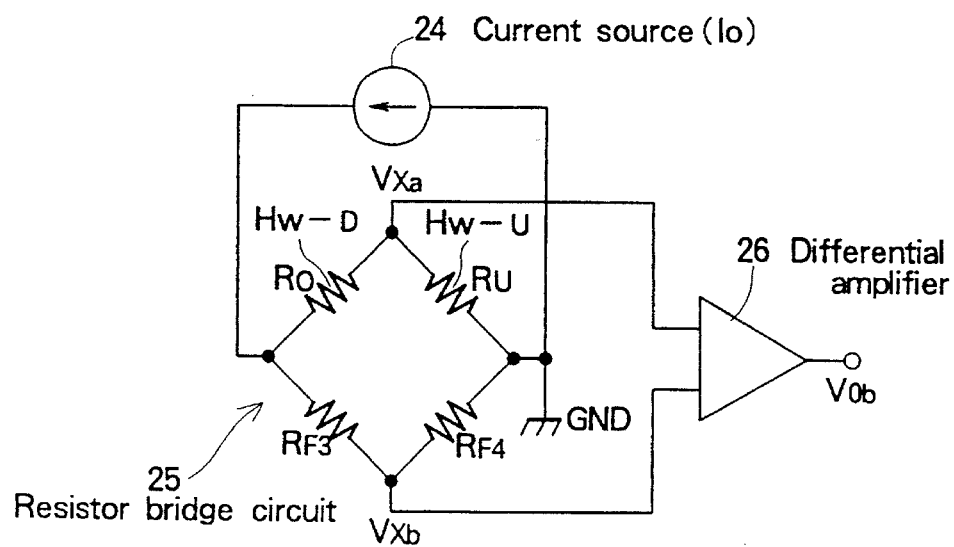
FIG. 7 is a circuit diagram showing components for detecting angular velocity in the pitch direction corresponding to FIG. 5.

FIG. 6 shows a circuit diagram for detecting angular velocity in the yaw direction and FIG. 7 shows a circuit diagram for detecting angular velocity in the pitch direction, corresponding to FIG. 5.

In FIG. 6, thermosensitive resistor elements $H_{W-L1}$ (resistor $R_{L1}$) and $H_{W-L2}$ (resistor $R_{L2}$), thermosensitive resistor elements $H_{W-R1}$ (resistor $R_{R1}$) and $H_{W-R2}$ (resistor $R_{R2}$), and reference resistors $R_{F1}$ and $R_{F2}$ respectively form the sides of a resistor bridge circuit 22.

A detected angular velocity output $V_{0a}$ corresponding to the difference between the direct current voltage outputs ($V_{Za}-V_{Zb}$) (corresponding to the combined resistance difference $R_{R1}+R_{R2}-R_{L1}-R_{L2}$) is obtained from a differential amplifier 23, and it is possible to detect angular velocity acting in the yaw direction.

FIG. 7 illustrates a resistor bridge circuit 25 which has the same construction as resistor bridge circuit 18 of FIG. 4 which has already been described, and therefore its description will be omitted.

Figure 8:
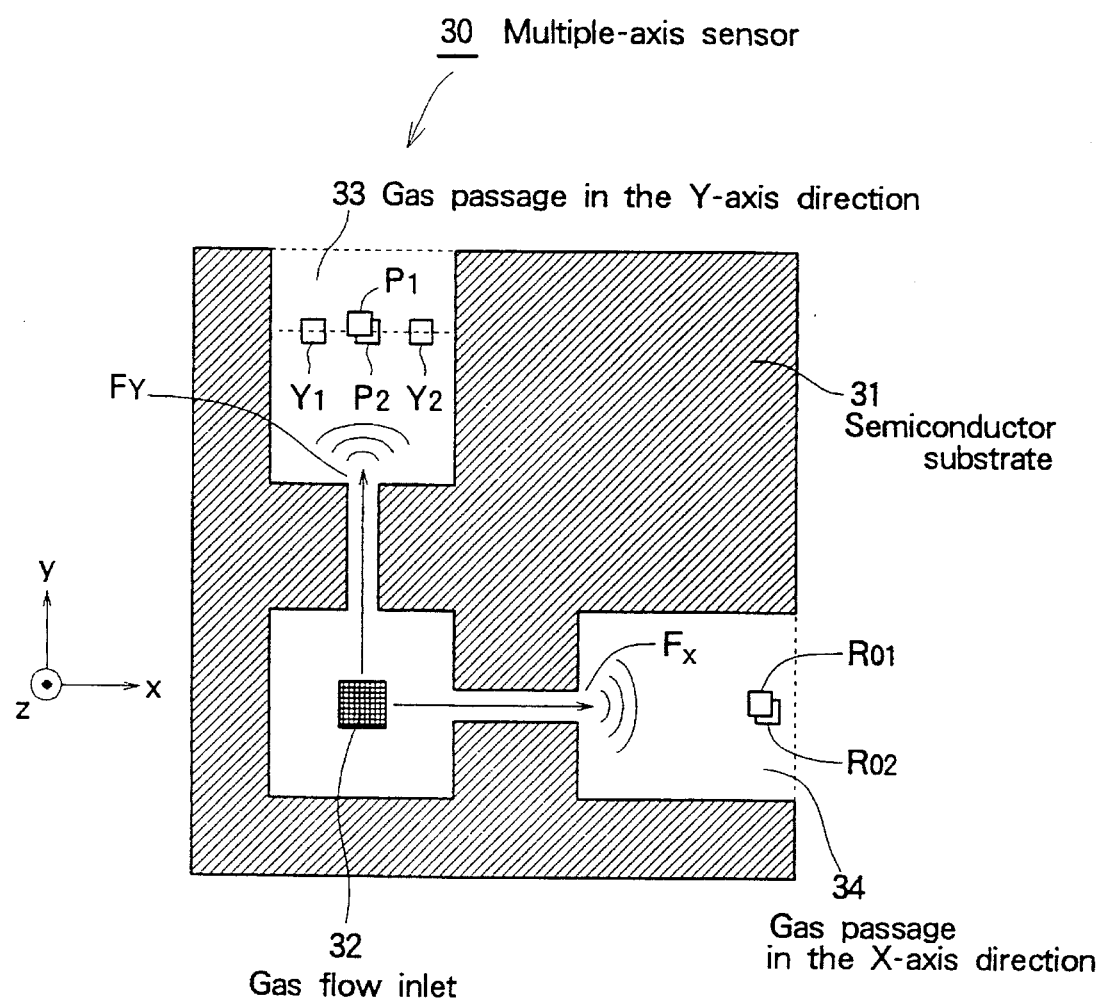
FIG. 8 is a conceptual diagram of a multiple-axis gas flow type angular velocity sensor with three axes, according to the present invention.

FIG. 8 shows a conceptual diagram of a multiple-axis gas flow type angular velocity sensor with three axes, according to the present invention.

In FIG. 8, a gas passage 34 in the X-axis direction is provided on a semiconductor substrate 31 in a multiple-axis gas flow type angular velocity sensor 30, in addition to the gas passage 33 in the Y-axis direction, which has already been described.

In the gas passage 33 in the Y-axis direction there are provided, as described with respect to FIG. 1, a pair of thermosensitive resistor elements $Y_1$ and $Y_2$ for detecting angular velocity in the yaw direction, and a pair of thermosensitive resistor elements $P_1$ and $P_2$ for detecting angular velocity in the pitch direction. In the gas passage 34 in the X-axis direction there is provided a pair of thermosensitive resistor elements $R_{01}$ and $R_{02}$, facing each other in the Z-axis direction, for detecting angular velocity in the roll direction about the Y-axis.

By arranging that gas jets $F_Y$ and $F_X$ be supplied simultaneously from a gas flow inlet 32 to the gas passage 33 in the Y-axis direction and the gas passage 34 in the X-axis direction it is possible to detect simultaneously and independently angular velocities acting in the yaw direction, the pitch direction and the roll direction.

In the present invention, as described above in detail with reference to embodiments, thermosensitive resistor elements are formed on semiconductor substrates such as silicon using a photo engraving process, which is a process for producing semiconductors, and thermosensitive resistor elements with good pairing properties are located accurately in desired positions, and it is therefore possible to provide a multiple-axis gas flow type angular velocity sensor which accurately and stably detects angular velocity acting in any direction.

Further, since the present invention can be constructed as a sensor including gas passages and a case by laminating a plurality of semiconductor substrates which are formed using a photo engraving process, it is possible to provide a multiple-axis gas flow type angulalr velocity sensor in which size-reduction and cost effectiveness of the sensor are achieved.

We claim:

1. A multiple-axis gas flow type angular velocity sensor which is provided with a plurality of pairs of thermosensitive resistor elements which are located perpendicular to and symmetrical about a central axis of a gas flow, the pairs of thermosensitive resistor elements being perpendicular to each other, wherein the sensor is constructed by laminating a plurality of semiconductor substrates, each of the semiconductor substrates having at least one of the thermosensitive resistor elements and a space forming a gas passage formed thereon using a semiconductor production process.

2. The multiple-axis gas flow type angular velocity sensor as claimed in claim 1, wherein a pair of thermosensitive resistor elements is located in each of two axial directions in the sensor, and wherein the sensor detects angular velocity acting in a yaw direction and a pitch direction.

3. The multiple-axis gas flow type angular velocity sensor as claimed in claim 1, wherein a pair of thermosensitive resistor elements is located in each of three axial directions in the sensor, and the sensor detects angular velocity acting in a yaw direction, a pitch direction and a roll direction.

4. The multiple-axis gas flow type angular velocity sensor as claimed in claim 1, further comprising resistor bridge circuits, each of said resistor bridge circuits comprising a pair of thermosensitive resistor elements and a pair of reference resistors, and an absolute value and direction of an angular velocity acting on the sensor in any direction is electrically detected.

5. The multiple-axis gas flow type angular velocity sensor as claimed in claim 1, wherein a first thermosensitive resistor element of a first pair of thermosensitive resistor elements and a first space forming a portion of said gas passage are formed on a first semiconductor substrate, a second pair of thermosensitive resistor elements and a second space forming a portion of said gas passage are formed on a second semiconductor substrate, a second thermosensitive resistor element of said first pair of thermosensitive resistor elements and a third space forming a portion of said gas passage are formed on a third semiconductor substrate, and said first, second and third semiconductor substrates are laminated together, in order, with a fourth semiconductor substrate to form said sensor.

6. The multiple-axis gas flow type angular velocity sensor as claimed in claim 1, wherein a first set of three thermosensitive resistor elements and a space forming a portion of said gas passage are formed on a first semiconductor substrate, a second set of three thermosensitive resistor elements and a space forming a portion of said gas passage are formed on a second semiconductor substrate, and said first and second semiconductor substrates and a third semiconductor substrate are laminated together to form said sensor.

7. The multiple-axis gas flow type angular velocity sensor as claimed in claim 6, wherein each said set of three thermosensitive resistor elements has a middle thermosensitive resistor element, and said middle thermosensitive resistor element from said first set and said middle thermosensitive resistor element from said second sets comprise a first of said pair of thermosensitive resistor elements.

8. In a multiple-axis gas flow angular velocity sensor having first and second pairs of thermosensitive resistor elements located perpendicular to each other and perpendicular to a central axis of a gas flow, an improvement comprising the first of said pairs of thermosensitive resistor elements and a portion of a first gas passage for said gas flow being formed on a first semiconductor substrate, a first thermosensitive resistor element of a second of said pairs of thermosensitive resistor elements and a portion of said first gas passage being formed on a second semiconductor substrate, a second thermosensitive resistor element of the second of said pairs of thermosensitive resistor elements and a portion of said first gas passage formed on at least one of either said first semiconductor substrate or a third semiconductor substrate, a portion of said first gas passage being formed in a fourth semiconductor substrate, and all of said semiconductor substrates aligned and laminated together to form said first gas passage around said first and second pairs of thermosensitive resistor elements.

9. The multiple-axis gas flow type angular velocity sensor as claimed in claim 8, wherein said pairs of thermosensitive resistor elements and said portions of said gas passage are formed on said semiconductor substrates by semiconductor making processes.

10. The multiple-axis gas flow type angular velocity sensor as claimed in claim 8, wherein said second thermosensitive resistor element of said second pair of thermosensitive resistor elements is formed on said third semiconductor substrate, and said first, second, third and fourth semiconductor substrates are laminated together in that order.

11. The multiple-axis gas flow type angular velocity sensor as claimed in claim 8, wherein said second thermosensitive resistor element of said second pair of thermosensitive resistor elements is formed on said first semiconductor substrate between said first pair of thermosensitive resistor elements.

12. The multiple-axis gas flow type angular velocity sensor as claimed in claim 11, wherein a third pair of thermosensitive resistor elements is formed on said second semiconductor substrate on either side of said first thermosensitive resistor element of said second pair of thermosensitive resistor elements.

13. The multiple-axis gas flow type angular velocity sensor as claimed in claim 12, wherein said first and third pairs of thermosensitive resistor elements are electrically combined for detecting angular velocity about a single axis.

14. The multiple-axis gas flow type angular velocity sensor as claimed in claim 8, wherein a third pair of thermosensitive resistor elements is provided in said semiconductor substrates in a second gas passage oriented perpendicular to the first gas passage for sensing angular velocity about a third axis.

* * * * *